(12) United States Patent
Thatcher et al.

(10) Patent No.: US 11,647,707 B2
(45) Date of Patent: May 16, 2023

(54) SYSTEM AND METHOD FOR THE INTEGRATED USE OF PREDICTIVE AND MACHINE LEARNING ANALYTICS FOR A CENTER PIVOT IRRIGATION SYSTEM

(71) Applicant: Valmont Industries, Inc., Omaha, NE (US)

(72) Inventors: Tracy A. Thatcher, Gretna, NE (US); Mark Moeller, Valley, NE (US); John Kastl, Wahoo, NE (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 17/946,451

(22) Filed: Sep. 16, 2022

(65) Prior Publication Data
US 2023/0013278 A1    Jan. 19, 2023

Related U.S. Application Data

(62) Division of application No. 16/894,996, filed on Jun. 8, 2020, now Pat. No. 11,483,987.
(Continued)

(51) Int. Cl.
| | |
|---|---|
| *A01G 25/16* | (2006.01) |
| *G05B 15/02* | (2006.01) |
| *G05B 19/042* | (2006.01) |
| *A01G 25/09* | (2006.01) |
| *G06Q 10/20* | (2023.01) |

(Continued)

(52) U.S. Cl.
CPC .......... *A01G 25/16* (2013.01); *A01G 25/092* (2013.01); *G05B 15/02* (2013.01); *G05B 19/042* (2013.01); *G05B 23/0283* (2013.01); *G06N 20/00* (2019.01); *G06Q 10/20* (2013.01); *H04W 4/021* (2013.01); *H04W 4/026* (2013.01); *H04W 4/027* (2013.01)

(58) Field of Classification Search
CPC ...... A01G 25/16; A01G 25/09; A01G 25/092; G05B 19/042; G05B 15/02
See application file for complete search history.

(56) References Cited

U.S. PATENT DOCUMENTS

| | | | |
|---|---|---|---|
| 6,512,992 B1 * | 1/2003 | Fowler | ................. A01B 79/005 702/155 |
| 2004/0117070 A1 * | 6/2004 | Barker | ................... A01G 25/16 700/284 |

(Continued)

*Primary Examiner* — Ronald D Hartman, Jr.
(74) *Attorney, Agent, or Firm* — Milligan PC LLO

(57) ABSTRACT

The present invention provides a system and method for analyzing sensor data related to an irrigation system. According to a preferred embodiment, the system includes algorithms for analyzing real-time, near real-time and historical data acquired from sensors in communication with a mechanized irrigation machine. Further, the algorithms of the present invention system may analyze collected sensor data to determine if an event has occurred or is predicted to occur. Further, the algorithms of the present invention may provide commands to an irrigation machine and notifications to users. According to further aspects of the present invention, the algorithms of the present invention may preferably apply machine learning and other data analysis tools to detect maintenance patterns, geographic trends, environmental trends, and to provide predictive analysis for future events.

3 Claims, 11 Drawing Sheets

Related U.S. Application Data

(60) Provisional application No. 62/858,366, filed on Jun. 7, 2019.

(51) Int. Cl.
*G06N 20/00* (2019.01)
*H04W 4/02* (2018.01)
*H04W 4/021* (2018.01)
*G05B 23/02* (2006.01)

(56) References Cited

U.S. PATENT DOCUMENTS

| | | | | |
|---|---|---|---|---|
| 2006/0027677 A1* | 2/2006 | Abts | ............... | A01G 25/092 |
| | | | | 239/69 |
| 2015/0060580 A1* | 3/2015 | Welch | ............... | A01G 25/092 |
| | | | | 239/729 |
| 2017/0339851 A1* | 11/2017 | Miller | ............... | F16H 9/04 |
| 2019/0235091 A1* | 8/2019 | Thatcher | ............... | G01S 19/51 |
| 2020/0383283 A1* | 12/2020 | Thatcher | ............... | A01G 25/165 |

* cited by examiner

SYSTEM AND METHOD FOR THE INTEGRATED USE OF PREDICTIVE AND MACHINE LEARNING ANALYTICS FOR A CENTER PIVOT IRRIGATION SYSTEM

RELATED APPLICATIONS

The present application is a division of U.S. Non-Provisional application Ser. No. 16/894,996 filed Jun. 8, 2020, which claims priority to U.S. Provisional Application No. 62/858,366 filed Jun. 7, 2019.

FIELD AND BACKGROUND OF THE PRESENT INVENTION

Field of the Present Invention

The present invention relates generally to a system and method for irrigation system management. More specifically, the present invention relates to a system and method for the integrated use of predictive and machine learning analytics for a center pivot irrigation system.

Background of the Invention

Modern center pivot and linear irrigation systems generally include interconnected spans (e.g., irrigation spans) supported by one or more tower structures to support the conduits (e.g., water pipe sections). In turn, the conduits are further attached to sprinkler/nozzle systems which spray water (or other applicants) in a desired pattern. In these modern irrigation systems, a significant number of powered elements are used to control various aspects of irrigation. These often include remote and independent power for a variety of sensors, sprayers, drive control systems, motors and transducers.

With their increasing complexity, modern irrigation machines are prone to malfunctions and maintenance issues which are not easily monitored or diagnosed. This problem is compounded by the fact that irrigation machines are designed for use by multiple operators having varied technical experience. Because of this, small maintenance issues within irrigation systems often go unnoticed until they become significant repair issues.

To overcome the limitations of the prior art, a reliable and effective system is needed to integrate data from multiple systems within an irrigation machine. Further, smart algorithms are needed to process system data and provide predictive analysis for the mechanized irrigation machine.

SUMMARY OF THE PRESENT INVENTION

To address the shortcomings presented in the prior art, the present invention provides a system and method for analyzing sensor data related to a center pivot irrigation system. According to a preferred embodiment, the system includes algorithms for analyzing combined real-time, near real-time and historical data acquired from an array of sensors to determine if an event has occurred or is likely to occur. Further, the algorithms of the present invention may provide commands to an irrigation machine and notifications to users.

According to an additional aspect of the present invention, the algorithms of the present invention may preferably apply machine learning and other data analysis tools to provide predictive analysis including discerning maintenance patterns, geographic trends and environmental trends.

Additionally, the algorithms of the present invention provide preventative, predictive and reactive maintenance analysis and notifications. According to a further aspect of the present invention, collected sensor data may also be combined with geolocation and clock data to analyze events and to generate warning and recommendations.

According to further preferred embodiments, sensor data may be processed and stored within the irrigation machine to provide alarms and notifications to operators in the field. Additionally, the processed and stored data may be combined and/or enhance with historic data from remote sources. The sensor data may also be transmitted to a remote site for remote processing, storage and analysis.

According to a further aspect of the present invention, the algorithms of the present invention may preferably apply machine learning and other data analysis tools to detect maintenance patterns, geographic trends, environmental trends, and provide predictive analysis for future events.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
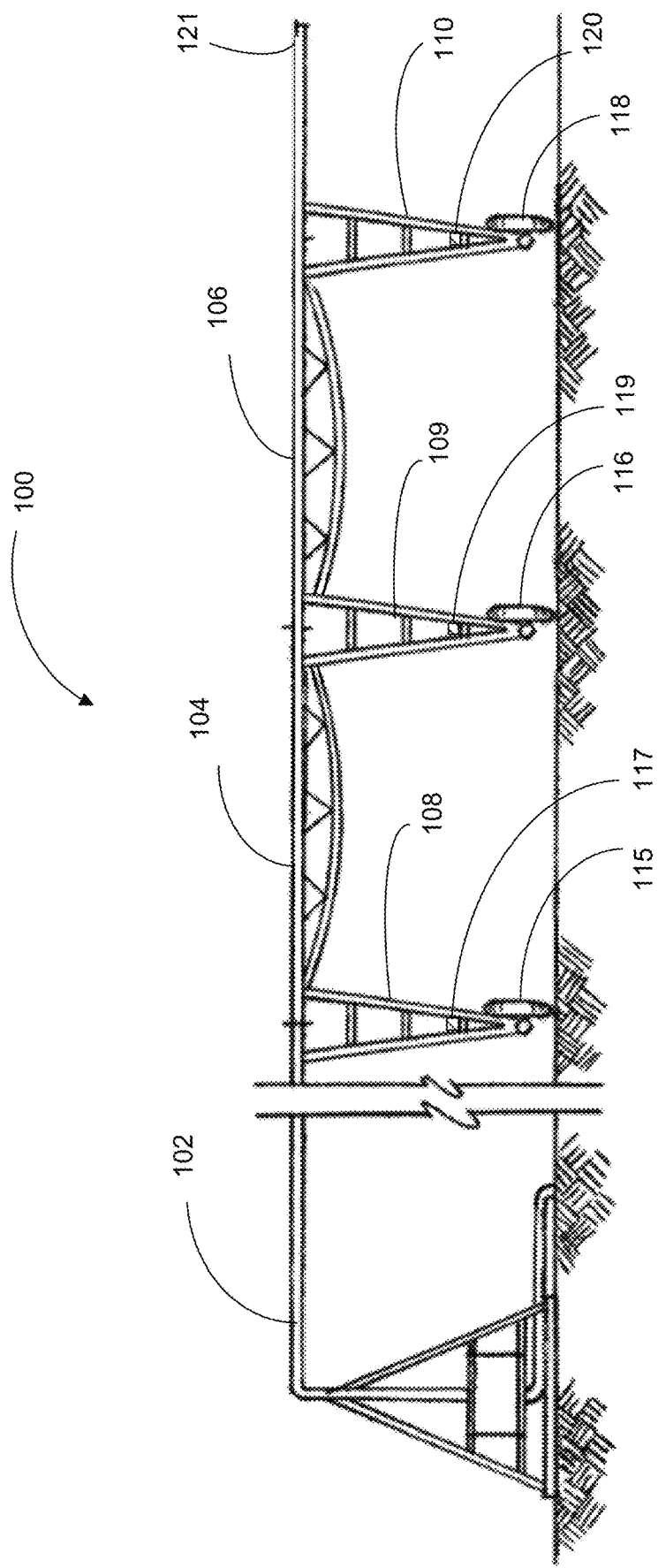
FIG. 1 shows an exemplary irrigation system for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic link library and/or other sequence of instructions designed for execution on a computer system. The term "data storage" as defined herein includes any type of computer readable media that allows a computer to electronically read and store data thereto. Such data storage can include, for example, non-volatile memory (such as ROM), flash memory, RAM, disk drive memory, CD-ROM, DVD, and other permanent storage media. However, even volatile storage such a RAM, buffers, cache memory, and network circuits are contemplated to serve as data storage according to different embodiments of the present invention.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types.

In accordance with preferred embodiments of the present invention, it should be understood that the term "drive unit" may preferably include a number of sub-components including: a motor, a controller, a communication device (such as a PLC or the like) and an alignment device. Further, while the invention is discussed below with respect to three exemplary towers, the number of towers used may be expanded or reduced (i.e. 1-100 towers) as needed without departing from the spirit of the present invention. Further, the term "motor" as used herein may refer to any suitable motor for providing torque to a drive wheel. Accordingly, the term "motor" as used herein may preferably include any type of motor including: switch reluctance, induction, gas powered, DC powered, single phase AC and the like.

FIGS. 1-5 illustrate various configurations of irrigation systems which may be used with example implementations of the present invention. As should be understood, the irrigation systems shown in FIGS. 1-5 are exemplary systems onto which the features of the present invention may be integrated. Accordingly, FIGS. 1-5 are intended to be purely illustrative and any of a variety of systems (i.e. fixed systems as well as linear and center pivot self-propelled irrigation systems; stationary systems; corner systems) may be used with the present invention without limitation.

With reference now to FIG. 1, spans 102, 104, 106 are shown supported by drive towers 108, 109, 110. Further, each drive tower 108, 109, 110 is shown with respective motors 117, 119, 120 which provide torque to the drive wheels 115, 116, 118. As further shown in FIG. 1, the irrigation machine 100 may preferably further include an extension/overhang 121 which may include an end gun (not shown).

Figure 3:
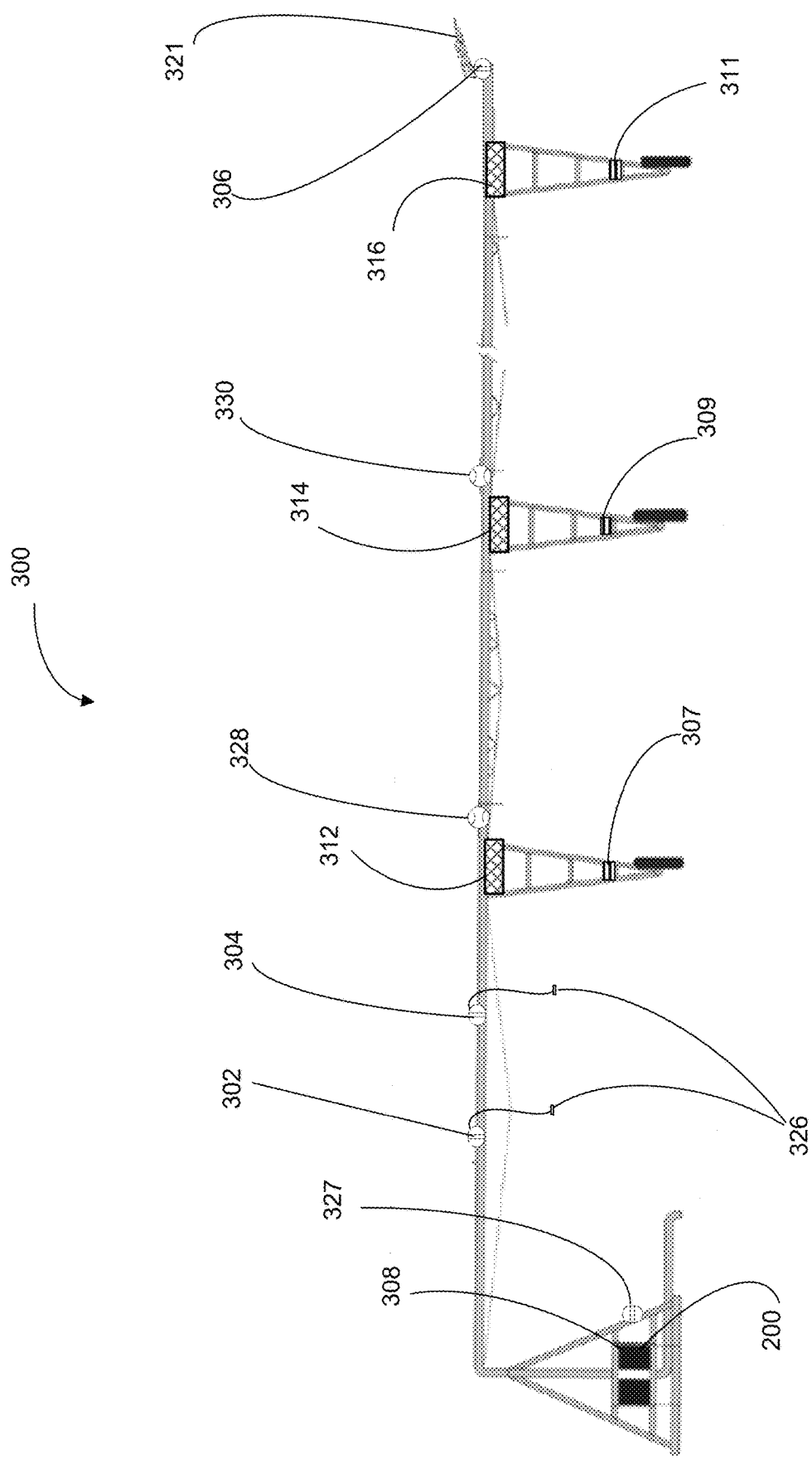
FIG. 3 shows an exemplary irrigation system in accordance with a further preferred embodiment of the present invention.

FIG. 1 provides an illustration of an irrigation machine 100 without many added powered elements and sensors. With reference now to FIG. 3, an exemplary system 300 is shown in which a number of exemplary powered elements are included. As shown, the powered elements may include transducers 327, 328, 330 which are provided to control and regulate water pressure through the system. Further, the system may further include valve controllers 302, 304, 306 to control individual sprinklers including the end gun 321 and other sprinkler heads 326. As further shown, the system may further include solid state tower boxes 312, 314, 316 (including solid-state motor controllers, non-contact alignment devices and other components) which are preferably interconnected to respective drive unit motors 307, 309, 311. Further, the system 300 of the present invention may preferably further include a control/pivot panel 308 which includes a central controller 200 as discussed further below.

Figure 2:
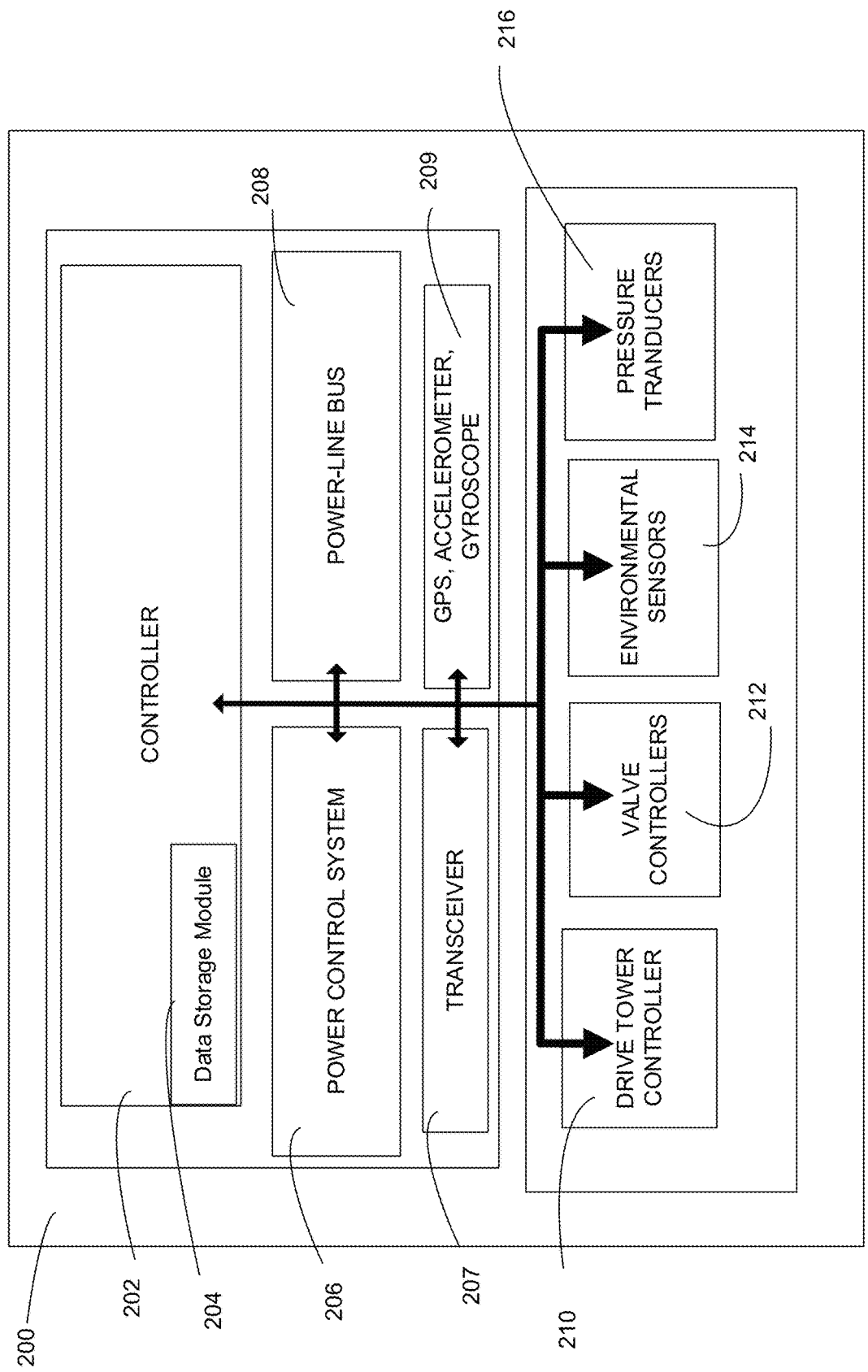
FIG. 2 shows a block diagram illustrating the exemplary processing architecture of a control device in accordance with a first preferred embodiment of the present invention.

With reference now to FIG. 2, an exemplary controller/control device 200 which represents functionality to control one or more operational aspects of the irrigation system 300 shall now be discussed. As shown in FIG. 2, an exemplary control device 200 of the present invention may preferably include a controller/processor 202 having a memory/data storage module 204. The controller 202 preferably provides processing functionality for the control device 200 and may include any number of processors, micro-controllers, or other processing systems. The controller 202 may execute one or more software programs that implement techniques and algorithms described herein. The data storage module 204 is an example of tangible computer-readable media that provides storage functionality to store various data associated with the operation of the control device 200, such as the software program and code segments mentioned above, or other data to instruct the controller 202 and other elements of the control device 200 to perform the steps described herein.

As further shown, the exemplary control device 200 may include a power control system 206 and a power-line BUS 208 which may include conductive transmission lines, circuits and the like for controlling and routing electric power and control signals to devices attached to a power-line carrier system as discussed further below. As further shown, the exemplary attached devices may include a mix of system sensors 209 (i.e. GPS/location detector, accelerometer, gyroscopes/tilt sensor), driver tower controllers 210, valve controllers 212, environmental sensors 214, pressure and flow sensors/transducers 216 and any of a variety of other powered devices as discussed further below. Additionally, the exemplary control device 200 may preferably include or be linked with a transceiver 207 for communicating with remote elements via satellite, cellular, or any other wireless system.

Figure 4:
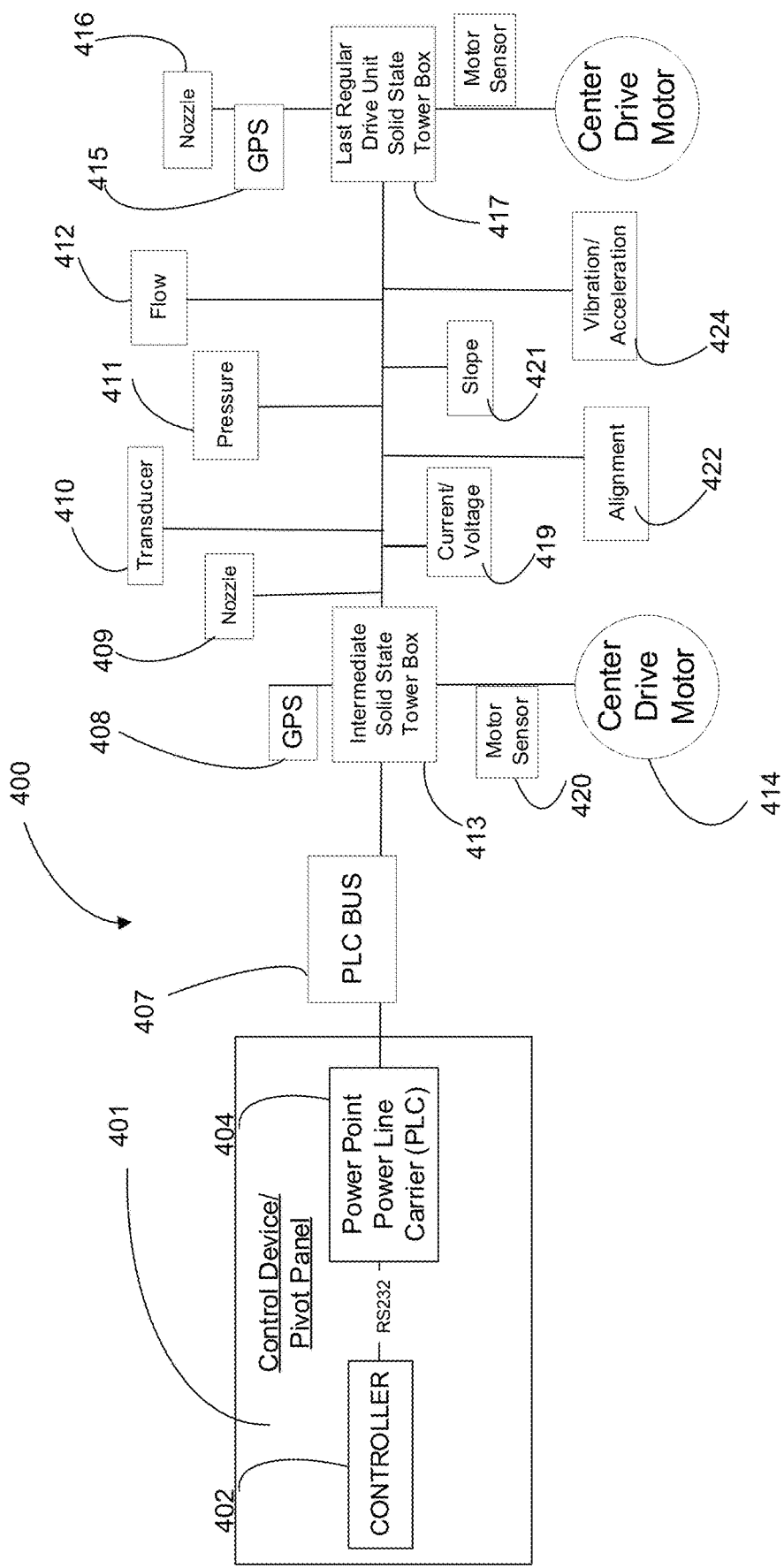
FIG. 4 shows a block diagram of an exemplary communication and control system for use with the present invention.

With reference now to FIG. 4, an exemplary communication and control system of the present invention shall now be discussed. As shown in FIG. 4, an example control device 401 may preferably communicate with and/or provide power to a variety of powered devices, sensors and/or motors of the present invention. According to preferred embodiments, the control device 401 may communicate and/or provide power to these elements via any wired or wireless system. Further, the communication, control and power signals may be separately controlled and transmitted or may be processed and transmitted together.

The system may preferably further utilize stored data available locally (e.g., at a drive unit or tower) on the machine. According to preferred embodiments, the data of the present invention may transmit via power line carrier or other transmission means (e.g., radio, LoRa, Zigbee, Bluetooth, etc.) to a collection point (e.g., pivot panel or tower box) or to a central or distributed computing unit (e.g., computer, edge computer or cloud) via any suitable system (e.g., radio, cellular modem, Wi-Fi, TCP/IP, power line carrier, etc.).

In the example shown in FIG. 4, a controller 402 may provide power and control signals via a Power Line Carrier (PLC) 404 system via a PLC BUS 407 or the like. As shown, the controller 402 may be integrated within a control device 401 (such as device 200 shown in FIG. 2). The controller 402 may preferably send/receive signals to solid-state tower boxes 413, 417 and other devices. As shown, such devices may include: GPS sensors 408, 415, transducers 410, pressure sensors 411, flow sensors 412, current/voltage sensors 419, alignment sensors 422, vibration/acceleration sensors 424, nozzle controllers 409, 416, motor controllers 414 and motor sensors 420. It should be understood that solid-state tower boxes and the other powered devices are provided purely as examples and the present invention is not intended to be limited to the use of solid-state tower boxes or any particular mix of powered devices. For example, electromechanical tower boxes may be used in place of the solid-state tower boxes without departing from the scope of the present invention. Further, separate power lines and control/communication lines (wired and wireless) may be used without limitation.

Figure 5:
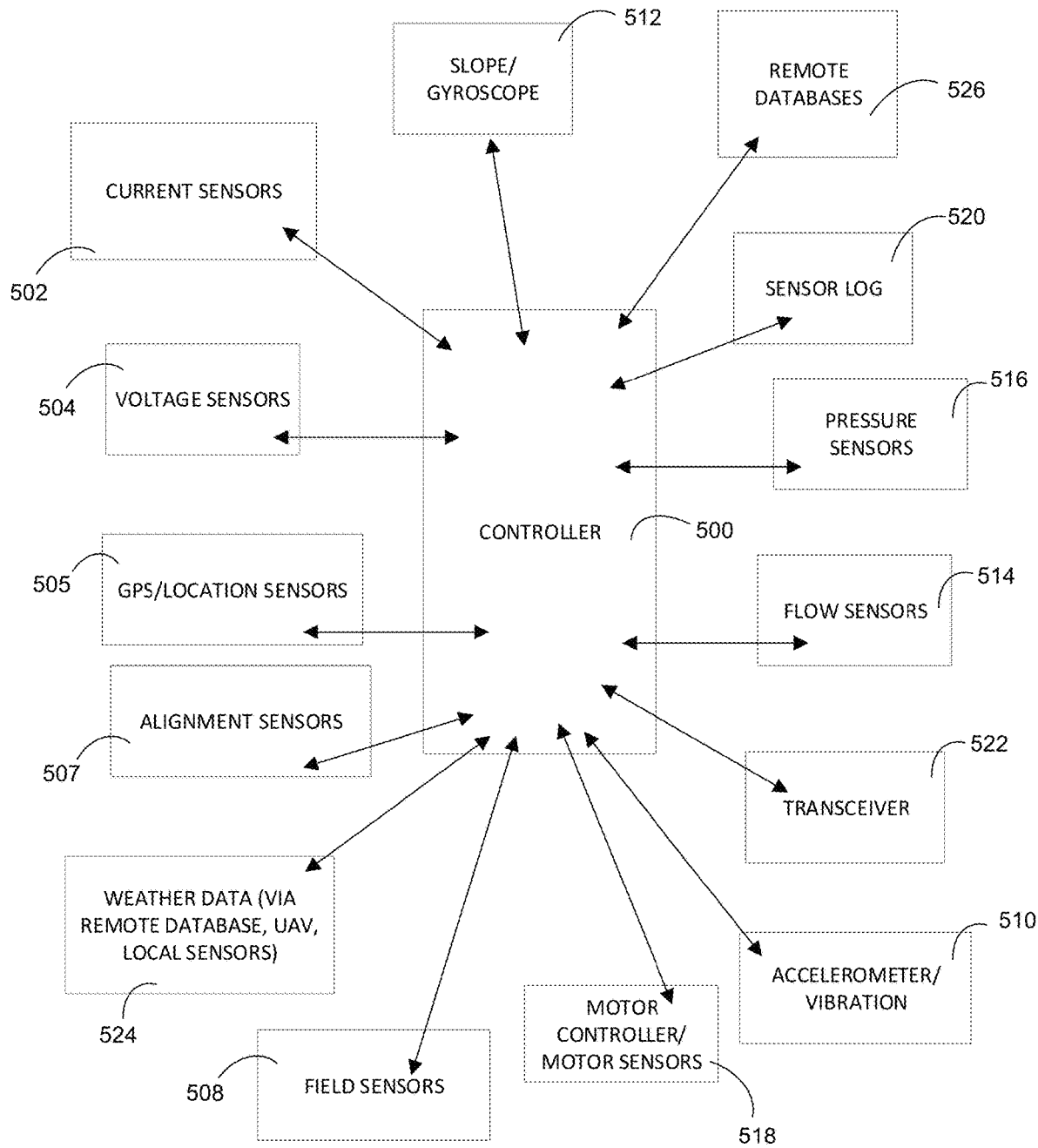
FIG. 5 shows a block diagram illustrating a range of exemplary data inputs in accordance with a further preferred embodiment of the present invention.

With reference now to FIG. 5, a diagram illustrating a further exemplary set of inputs and data provided to the central controller 500 of the present invention is provided. As shown, the systems and devices providing data to the controller 500 may include the inputs listed below.

| Sensor/Device Inputs |
| --- |
| Current Sensors 502 |
| Voltages Sensors 504 |
| GPS/Location Sensors 505 |
| Alignment Sensors 507 |
| Field Sensors 508 |
| Accelerometer/Vibration Sensor 510 |
| Slope/Gyroscopic Sensor 512 |
| Flow Sensors 514 |
| Pressure Sensor 516 |
| Motor Controller/Motor Sensors 518 |
| Sensor Log 520 |
| Transceiver 522 |
| Weather/Imagery Data 524 |
| Remote Databases 526 (Historic data, machine specs) |

According to preferred embodiments, the data provided to the controller 500 may alternatively be provided indirectly to the controller 500 via any arrangement of separate processors and data storage. For example, sensor data may first be processed, sorted, analyzed and stored by a separate processor or device. Thereafter, the final processed data may then preferably be accessed by the controller 500 as needed to execute the functions and algorithms of the present invention.

Further, the remote databases 526 may include databases which include third-party data (e.g. specification data for irrigation machine components, recall notices etc.) and the like. As discussed further below, the algorithms of the present invention may preferably use this data together with other recorded data (e.g. engine hours, weather, speed etc.) along with onboard sensors to determine if a component has been used out of specification and/or if replacement is needed. For example, if the system senses a speed above the speed rating for the tires, an alert can be triggered. In further examples, a detection of hours, heat, humidity and/or the like outside a given range may also trigger or alter a replacement schedule as discussed further below.

Figure 6:
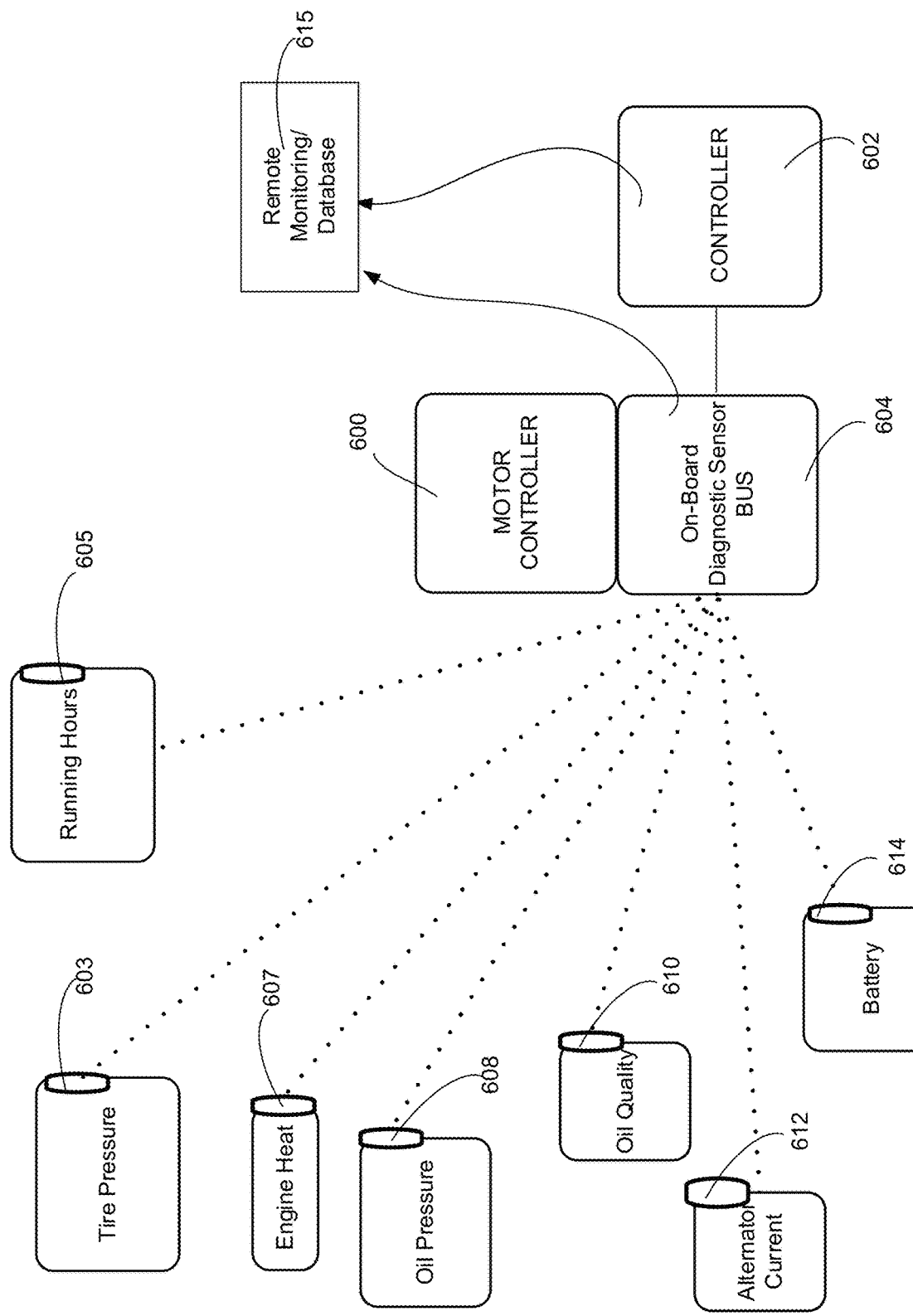
FIG. 6 shows a block diagram illustrating a machine monitoring system with a range of exemplary machine operation data inputs in accordance with a further preferred embodiment of the present invention.

With reference now to FIG. 6, an exemplary motor controller 600 of the present invention may receive data from motor specific sensors 603-614. These motor specific sensor 603-614 may output diagnostic data regarding aspects of one or more motors or drive related components (e.g. tires, axel, brakes) of the present invention. The output from these sensors may alternatively be transmitted directly to the central controller 602 or may be provided through the motor controller 600 via a diagnostic sensor BUS 604 or the like. Further, the data may be remotely stored via a database 615 or the like. As shown in FIG. 6, example motor specific sensors may include any of the following sensors which may produce selective operational data for a given motor.

| MOTOR SENSOR | MOTOR SENSOR OUTPUT |
| --- | --- |
| TIRE PRESSURE SENSOR 603 | Tire pressure. |
| RUNNING HOURS SENSOR 605 | Total hours running. |
| ENGINE HEAT SENSOR 607 | Temperature of engine |
| OIL PRESSURE SENSOR 608 | Pressure of oil |
| OIL QUALITY SENSOR 610 | Viscosity and purity of oil |
| ALTERNATOR CURRENT SENSOR 612 | Current and voltage produced by alternator |
| BATTERY SENSOR 614 | Current and voltage output by battery |

With reference now to FIGS. 7-11, the controller(s) of the present invention may preferably process, analyze and apply machine learning algorithms to the sensor and machine data discussed above. Specifically, the data may be analyzed using algorithms and/or machine learning to analyze the incoming data and determine a problem, an incipient problem, or a predicted problem. Further, the algorithms of the present invention may command an action or recommend an action to the appropriate personnel (e.g., operator, owner, service person, or dealer). According to another aspect of the present invention, the commands and recommendations may include instructions regarding preventative maintenance. Such notifications may also provide selectable options for an operator which may trigger actions by the irrigation machine as discussed further below.

With regards to motor specific sensors 603-614, the present invention may preferably store pre-determined threshold levels for each sensor output which may directly trigger notifications regarding preventative maintenance or machine failures. For example, the oil pressure sensor 608 may trigger a low oil notification when a predetermine level is crossed and the oil quality sensor 610 may trigger a notification to schedule an oil change if oil viscosity falls outside of pre-determined ranges. Similarly, data from a tire pressure sensor 603 may be used to send a notification a flat tire if rapid pressure loss is detected.

Additionally, the system of the present invention may preferably store a set time for maintenance and checks of various parameters on a machine and then track the elapsed time and/or operating hours of the individual components to trigger notifications. For example, the running hours sensor 605 may track the motor operating time and/or speed (for constant-move drive units) and send a notification to change center-drive or wheel gearbox oil. Likewise, the system may record times of specific maintenance events and calculate the number of engine hours from the time of the recorded maintenance event. For example, the system may track the operating time since an oil change and send notification of a need for a new oil change based on a selected number of hours.

Figure 7:
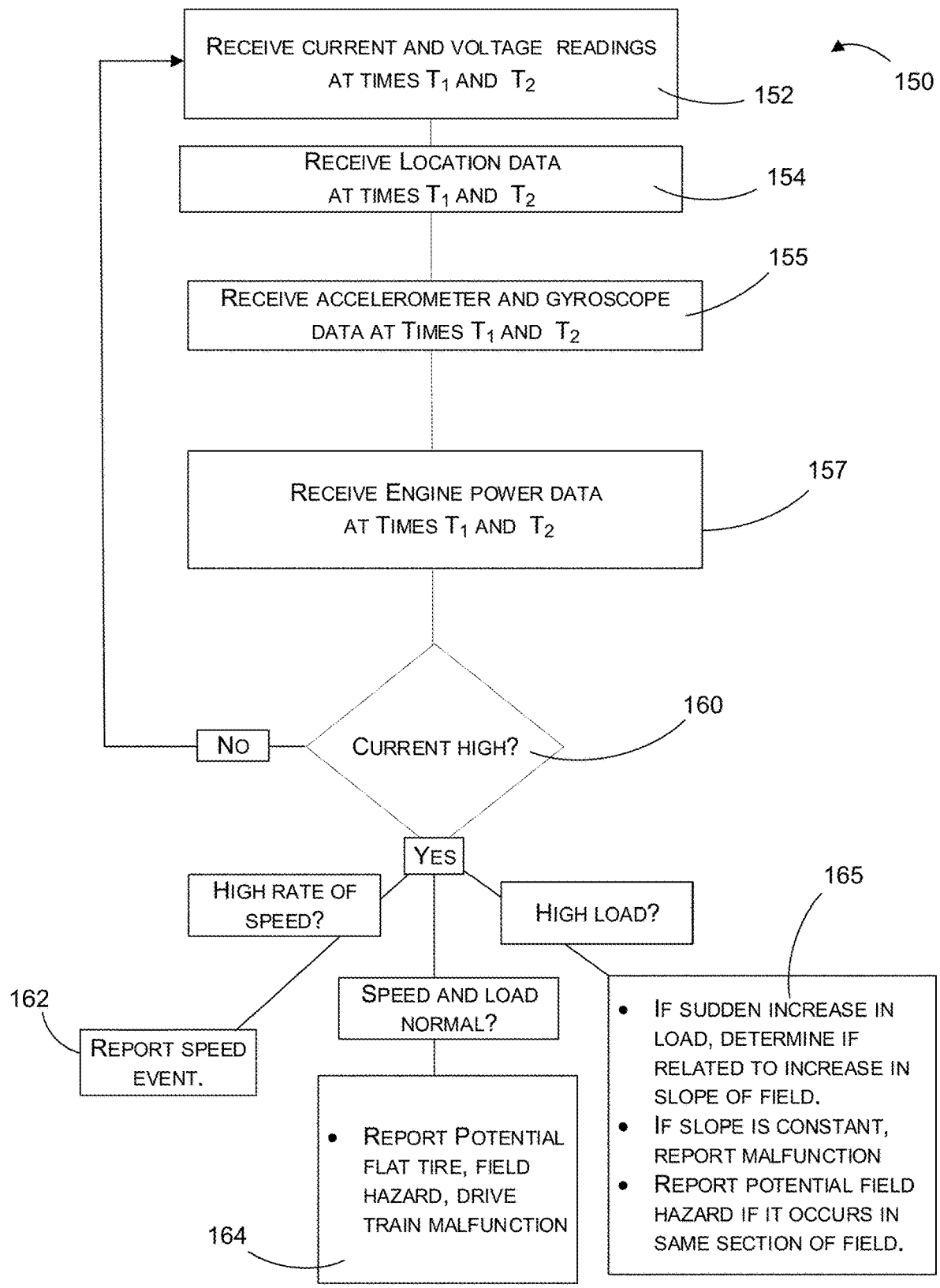
FIG. 7 shows an exemplary algorithm for processing electrical current and voltage data in accordance with a preferred embodiment of the present invention.

With reference now to FIG. 7, an exemplary algorithm 150 for analyzing changes in electrical current and voltage sensor data shall now be discussed. As shown in FIG. 7, at a first step 152, current and voltage data may be recorded and stored at times $T_1$ and $T_2$. At a next step 154, location data for the irrigation machine may be recorded and stored at times $T_1$ and $T_2$. At a next step 155, accelerometer and gyroscope data may be recorded and stored at times $T_1$ and $T_2$. At a next step 157, engine power data may be recorded and stored at times $T_1$ and $T_2$.

At a next step 160, the system may preferably determine whether the measured current exceeds a prescribed level. If NO, the system may return to step 152 to receive new data. If YES, the system preferably determines if the irrigation machine has undergone a high load event. For example, in step 162, the system may analyze accelerometer and/or speedometer data to determine whether the machine traveled at a high rate of speed at the measured times. If so, a notification of the high speed event may be sent. In step 165, the system may further analyze whether a high load event has occurred based on: 1) gyroscopic data indicating high slope in the field; or 2) GPS data and field data indicating rough terrain. In step 164, if the speed and load are determined to be normal, the system at step 164 may trigger a report of a potential flat tire, a field hazard, a drive train malfunction or the like.

In accordance with further aspects, the system of the present invention may alternatively use electrical current data to determine whether a motor or gear box is going bad, or whether there is an issue with a drive unit. Further, the system may analyze recorded power consumption levels for specific areas of a given field at specific speeds. Using this stored data, the system may determine whether a given increase in electrical current represents a repair issue by comparing previous current levels at the same field locations at the same sensed speeds.

According to further aspects, the present invention includes algorithms for analyzing detected phase imbalances to predict a state or winding failure. For example, the algorithms may apply Fourier transformations to detected current waves and then compare their harmonics over time. If the harmonics fall outside of specific thresholds, the system may provide notification that there is a broken rotor winding, rotor pole or the like. The exemplary algorithms may also use the phase imbalances of any running motors to determine the location and nature of any detected power failures. For example, a phase imbalance may be analyzed to determine if a power failure indicates a blown fuse or a one-way contact failure. In another example, a determination may be based on whether a single leg is bad on the power side which would indicate that there was one blown fuse on a given span or unit. The present invention may also include algorithms to compare frequencies involved in the current and voltage waveforms and to correlate the existence of certain frequencies or patterns of frequencies to known failures based on correlation with historical data.

Figure 8:
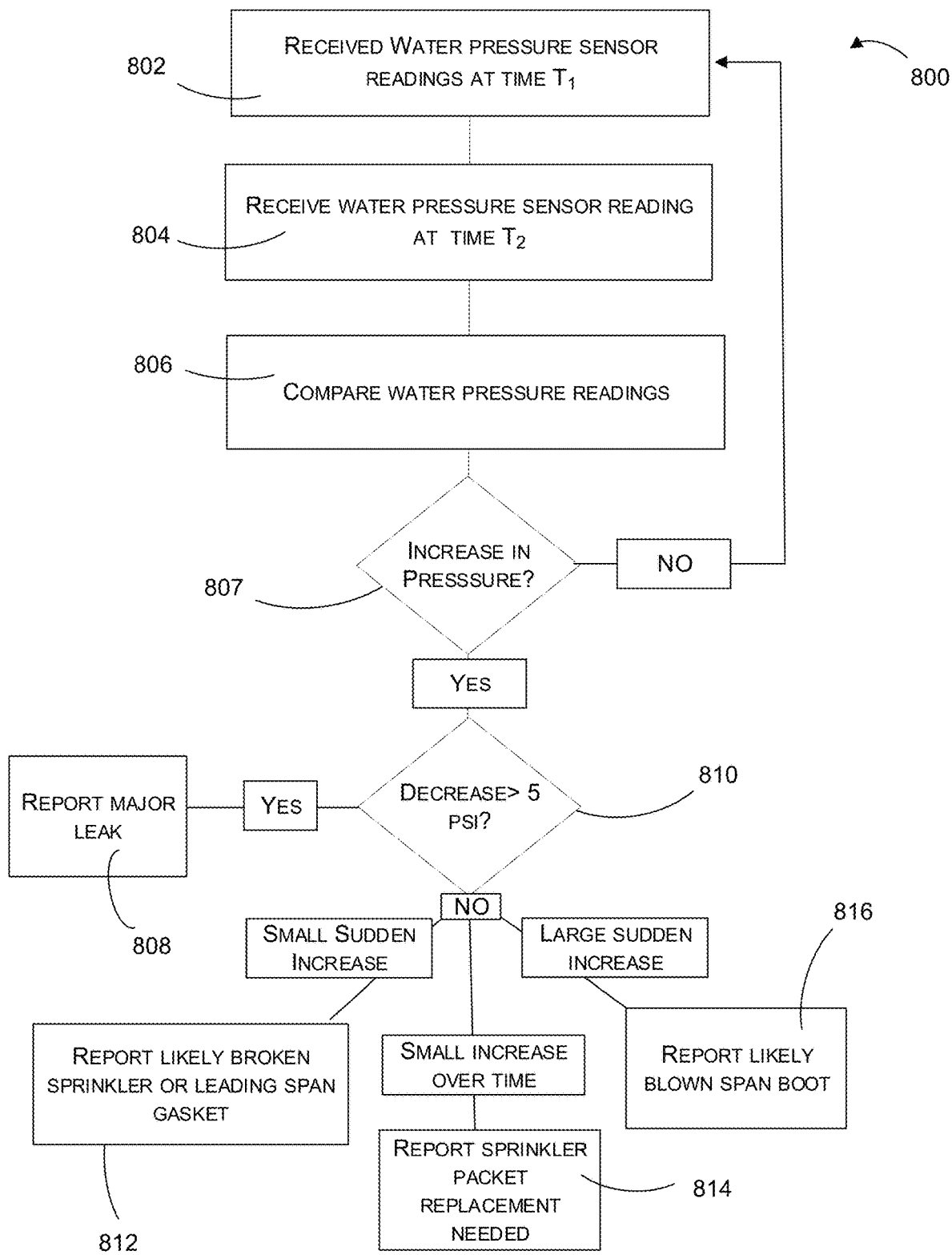
FIG. 8 shows an exemplary algorithm for processing water pressure data in accordance with a preferred embodiment of the present invention.

With reference now to FIG. 8, an exemplary algorithm 800 for analyzing measured water pressure rates shall now be discussed. As shown in FIG. 8, at a first step 802, water pressure sensor readings may be recorded and stored for a first time $T_1$. At a next step 804, water pressure sensor readings may be recorded and stored at a second time $T_2$. At a next step 806, the system may preferably compare the recorded water pressure data at times $T_1$ and $T_2$. At a next step 807, the system preferably determines whether any increase in water pressure has occurred. If NO, the system returns to step 802 and receives new data. If YES, the system proceeds to step 810 and determines whether the water pressure has decreased by more than 5 psi between times $T_1$ and $T_2$. If YES, the system at step 808 preferably determines that a major water leak has occurred, and the system creates a notification.

If NO, the system analyzes the data further to determine if the increase in water pressure is a 1) small, sudden increase; 2) a small increase over an extended time period; or 3) a large, sudden increase (of less than 5 psi). If the algorithm determines that the pressure increase is small and sudden, the system at step 812 may provide a notification to check for a broken sprinkler, a broken leading span gasket or the like. If the algorithm determines that the pressure increase is small and over an extended time period, the system at step 814 may provide a notification that a sprinkler package replacement may be needed. If the algorithm determines that the pressure increase is large and sudden (but under 5 psi), the system at step 816 may provide a notification to check for a blown span boot or the like.

Figure 9:
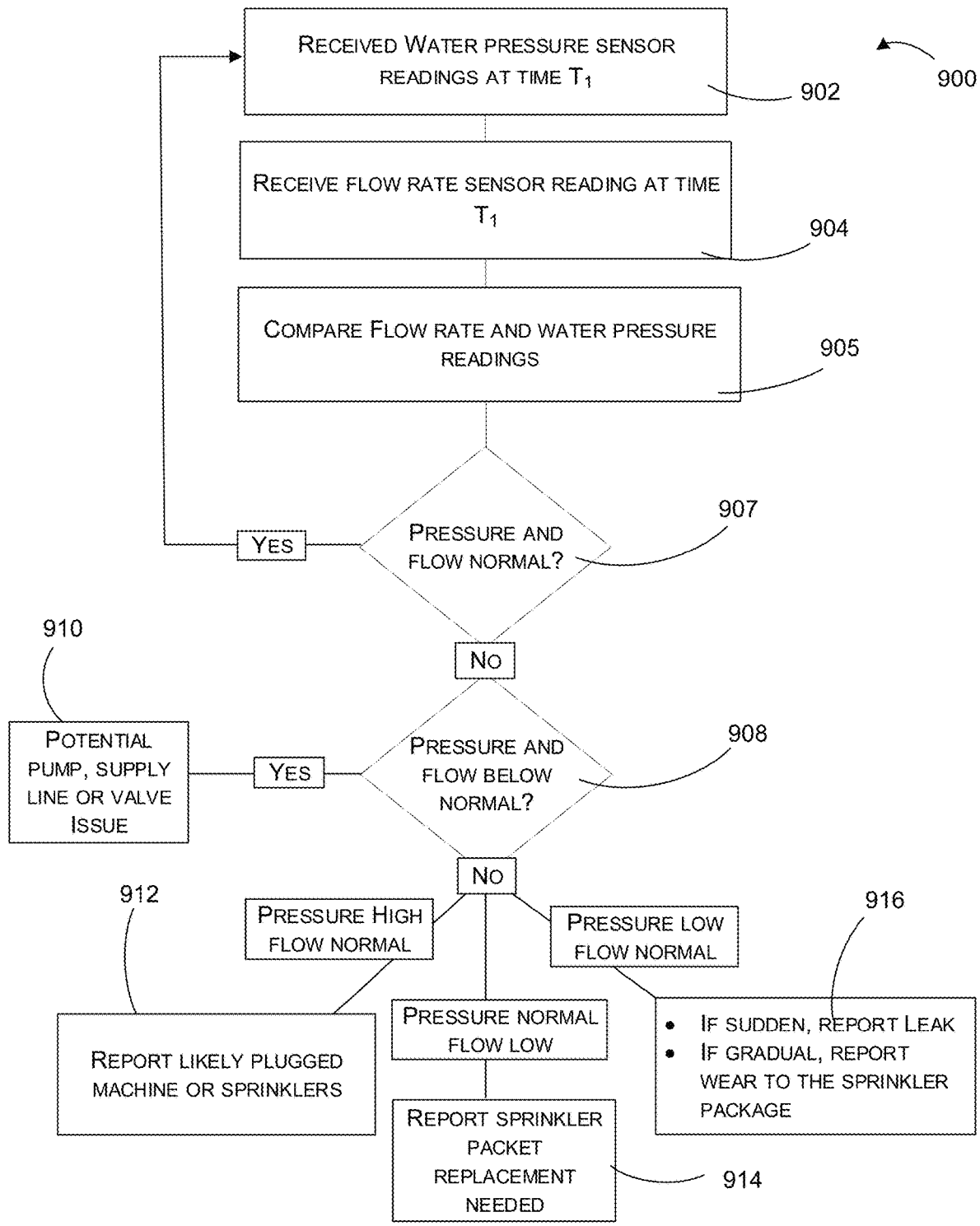
FIG. 9 shows an exemplary algorithm for processing water pressure data and flow rate data in accordance with a preferred embodiment of the present invention.

With reference now to FIG. 9 an exemplary algorithm 900 for analyzing measured water pressure rates and water flow rates shall now be discussed. As shown in FIG. 9, at a first step 902, water pressure sensor readings may be recorded and stored for a first time $T_1$. At a next step 904, water flow sensor readings may be recorded and stored at a time $T_1$. At a next step 905, the system may preferably compare the recorded water pressure and water flow data at time $T_1$. At a next step 907, the system may preferably determine whether both the water pressure rates and the water flow rates are within predetermined limits. If YES, the algorithm returns to step 902 and receives new data. If NO, the algorithm preferably proceeds to step 908 and determines whether both the water pressure and the water flow rates are below normal. If YES, the algorithm proceeds to step 910 and generates a notice regarding a potential water supply issue such as a malfunction at the pump, the supply line or the main supply valve.

If the system at step 908 determines NO, then the algorithm preferably compares the water pressure and flow rates to determine a likely maintenance issue. For example, if the system determines that the pressure is HIGH and the flow is NORMAL, the algorithm at step 912 preferably generates a notice that there is a likely issue with the machine or sprinkler being plugged. Alternatively, if the system determines that the pressure is NORMAL and the flow is LOW, the algorithm at step 914 preferably may generate a notice that sprinkler packet may need replacement. Still further, if the system determines that the pressure is LOW and the flow is NORMAL, the algorithm at step 916 may preferably report a potential leak (if the change is over a short period of time) or report potential wear to the sprinkler package (if the change is over a longer period of time).

Figure 10:
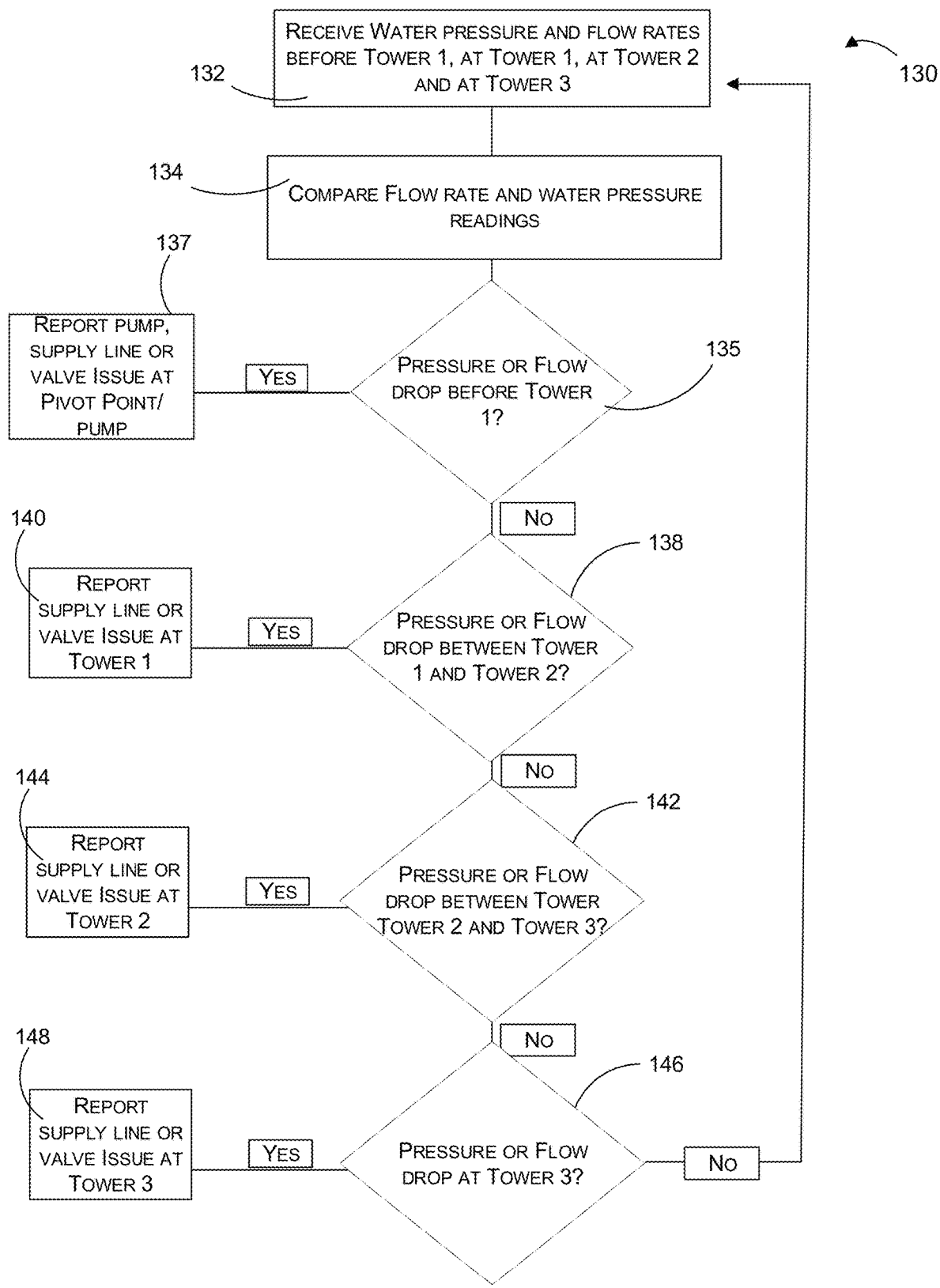
FIG. 10 shows an exemplary algorithm for further processing of water pressure data and flow rate data in accordance with a preferred embodiment of the present invention.

With reference now to FIG. 10, a further exemplary algorithm 130 is shown which assists operators in locating issues in an irrigation machine. The algorithm 130 is explained with respect to a system which includes three or more drive towers (Towers 1, 2, and 3). However, it should be understood that the location algorithm may be applied to any set of points within an irrigation system and that the exemplary drive tower points are for illustration only.

As shown in FIG. 10, at a first step 132, the algorithm preferably first receives water pressure and flow rates before Tower 1, at Tower 1, at Tower 2 and at Tower 3. At a next step 134, the system may preferably compare the recorded water pressure and water flow readings. At a next step 135, the algorithm preferably determines whether the pressure or flow rates drop before Tower 1. If YES, the algorithm at step 137 preferably prepares a notification that a pump, supply line or valve issue is likely present at the pivot point/pump.

If NO, the algorithm preferably proceeds to step 138 and determines whether the pressure or flow rates drop between Tower 1 and Tower 2. If YES, the algorithm preferably generates at step 140 a notice that there is a potential water supply issue at Tower 1.

If NO, the algorithm preferably proceeds to step 142 and determines whether the pressure or flow rates drop between Tower 2 and Tower 3. If YES, the algorithm preferably generates at step 144 a notice that there is a potential water supply issue at Tower 2.

If NO, the algorithm preferably proceeds to step 146 and determines whether the pressure or flow rates drop at Tower 3. If YES, the algorithm preferably generates at step 148 a notice that there is a potential water supply issue at Tower 3. If NO, the system returns again to step 132 to receive new data.

Figure 11:
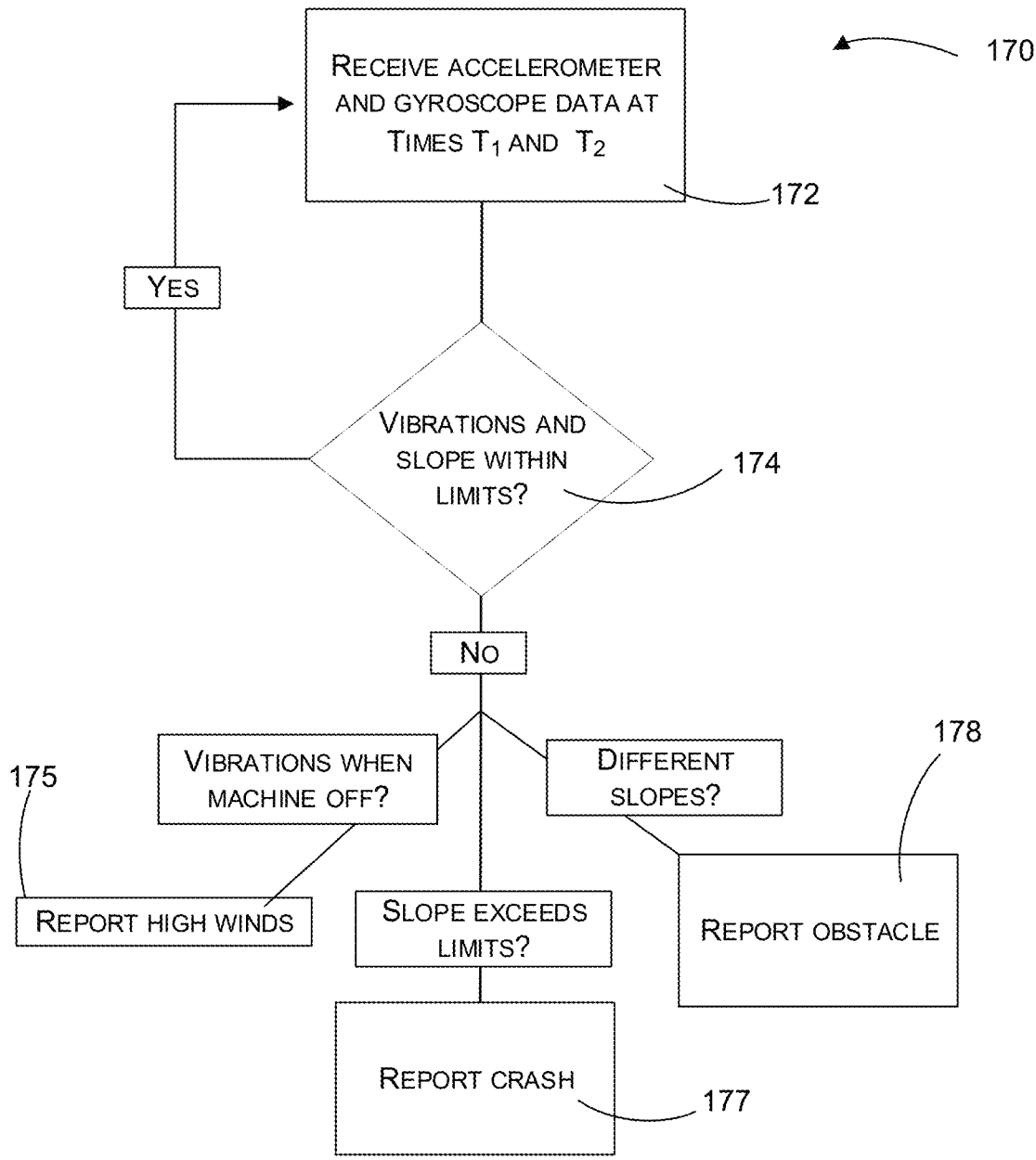
FIG. 11 shows an exemplary algorithm for processing accelerometer and gyroscopic data in accordance with a preferred embodiment of the present invention.

With reference now to FIG. 11, an exemplary algorithm 170 for analyzing accelerometer and gyroscopic data shall now be discussed. As shown in FIG. 11, at a first step 172 accelerometer and gyroscopic data may be recorded and stored at times $T_1$ and $T_2$. At a next step 174, accelerometer and gyroscopic data is analyzed to determine if they both fall with threshold limits. If YES, the system returns to step 172 and receives new data.

If NO, the algorithm analyzes the accelerometer and gyroscopic data against other stored data. At step 175, the algorithm may report high winds if the system determines that the machine is vibrating when turned off. At step 177, the algorithm may report a crash if the slope/tilt indicated by the gyroscopic sensor exceeds specific slope limits. At step 178, the algorithm may report an obstacle if different slopes are reported from different gyroscopic sensors.

While the above descriptions regarding the present invention contain much specificity, these should not be construed as limitations on the scope, but rather as examples. Many other variations are possible. For example, the processing elements of the present invention by the present invention may operate on a number of different frequencies, voltages, amps and BUS configurations. Further, the systems of the present invention may be used with any arrangement of drive towers including both linear and center pivot systems. Further, as needs require, the processes for transmitting data within the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A system for use with a self-propelled irrigation system having at least one span and a drive system for moving the span across a given field to be irrigated, wherein the system comprises:
    a plurality of sensors detecting a plurality of system data for the irrigation system; wherein the system data comprises: speed data, accelerometer data and gyroscopic data;
    a location sensor providing geolocation data; wherein the geolocation data comprises the geolocation of the irrigation system during a first time period; and
    a machine analysis module configured to receive system data and geolocation data; the machine analysis module applying at least a first model algorithm to produce system notifications for the irrigation system;
    wherein the machine analysis module is configured to receive first accelerometer data for the first time period;
    wherein the machine analysis module is configured to receive first gyroscopic data for the first time period;
    wherein the machine analysis module is configured to receive first speed data for the first time period;
    wherein the machine analysis module is configured to compare the first gyroscopic data to a predetermined slope threshold at a first geolocation;
    wherein the machine analysis module is configured to compare the first accelerometer data to a predetermined accelerometer threshold at the first geolocation;
    wherein the machine analysis module is configured to determine that the irrigation system is stationary based at least in part on system data.

2. The system of claim 1, wherein the machine analysis module is configured to determine a high wind condition when the first accelerometer data exceeds the first accelerometer threshold and the irrigation is determined to be stationary.

3. The system of claim 2, wherein the machine analysis module is configured to identify a hazard condition when the predetermined slope threshold is exceeded.

* * * * *